(12) United States Patent
Sun et al.

(10) Patent No.: US 6,592,742 B2
(45) Date of Patent: Jul. 15, 2003

(54) ELECTROCHEMICALLY ASSISTED CHEMICAL POLISH

(75) Inventors: Lizhong Sun, San Jose, CA (US); Shijian Li, San Jose, CA (US)

(73) Assignee: Applied Materials Inc., Santa Clara, CA (US)

( * ) Notice: Subject to any disclaimer, the term of this patent is extended or adjusted under 35 U.S.C. 154(b) by 0 days.

(21) Appl. No.: 09/905,315

(22) Filed: Jul. 13, 2001

(65) Prior Publication Data

US 2003/0010648 A1 Jan. 16, 2003

(51) Int. Cl.$^7$ ................................................ B23H 3/00
(52) U.S. Cl. ...................................... 205/651; 205/684
(58) Field of Search ............................... 205/674, 684, 205/651

(56) References Cited

U.S. PATENT DOCUMENTS

| | | | |
|---|---|---|---|
| 4,169,337 A | 10/1979 | Payne | 51/283 R |
| 4,588,421 A | 5/1986 | Payne | 51/308 |
| 4,752,628 A | 6/1988 | Payne | 523/122 |
| 4,793,895 A | 12/1988 | Kaanta et al. | 156/627 |
| 4,839,005 A | 6/1989 | Katsumoto et al. | 204/129.46 |

(List continued on next page.)

FOREIGN PATENT DOCUMENTS

| | | | |
|---|---|---|---|
| EP | 0 659 858 | | 6/1995 |
| EP | 0 846 742 | | 6/1998 |
| EP | 0 896 042 | | 2/1999 |
| EP | 0 913 442 | | 5/1999 |
| FR | 2 722 511 | | 1/1996 |
| JP | 10-130632 | * | 5/1998 |
| JP | 2001-77117 | | 3/2001 |
| JP | 2001-77117 A | | 4/2001 |
| WO | WO 97/34030 | * | 9/1997 |
| WO | 98/49723 | | 11/1998 |
| WO | 99/53532 | | 10/1999 |
| WO | 99/61540 | | 12/1999 |
| WO | 00/00561 | | 1/2000 |
| WO | 00/00567 | | 1/2000 |
| WO | 00/30159 | | 5/2000 |
| WO | 00/36037 | | 6/2000 |
| WO | 00/49647 | | 8/2000 |
| WO | 00/53691 | | 9/2000 |
| WO | 01/12379 | | 2/2001 |

OTHER PUBLICATIONS

Boisde, Paul M.; Meuly, Walter C.; and Rhone–Poulene, Inc., "Coumarin", Kirk–Othmer Encyclopedia of Chemical Technology, Copyright 1993 by John Wiley & Sons.*
Nogami, "*An Innovation to Integrate Porous Low–K Materials and Copper*", *Interconnect Japan 2001*; Honeywell Seminar (Dec. 6, 2001) pp. 1–12.
U.S. Ser. No. 09/968,864, filed Oct. 27, 2000 to Sun, et al.
U.S. Ser. No. 09/698,863, filed Oct. 27, 2000 to Tsai, et al.
U.S. Ser. No. 09/694,866, filed Oct. 23, 2000 to Wang, et al.
U.S. Ser. No. 09/608,078, filed Jun. 30, 2000 to Sun, et al.
U.S. Ser. No. 09/606,544, filed Jun. 30, 2000 to Bajaj, et al.
U.S. Ser. No. 09/569,968, filed May 11, 2000 to Sun.
U.S. Ser. No. 09/543,777, filed Apr. 5, 2000 to Sun, et al.

*Primary Examiner*—Patrick Ryan
*Assistant Examiner*—Thomas H. Parsons
(74) *Attorney, Agent, or Firm*—Moser, Patterson & Sheridan (57) ABSTRACT

A method of chemically polishing a metal layer on a substrate is provided. The metal layer is chemically polished using an electrochemical polishing (ECP) process. In the ECP process, the substrate is immersed in a chemical polishing solution including a surfactant. The surfactant in the polishing solution covers the surface of the substrate such that only topographic portions of the substrate surface are exposed to the chemical polishing solution. Thereafter, an electrical potential applied to the substrate removes topographic portions of the substrate that are exposed to the polishing solution.

20 Claims, 6 Drawing Sheets

U.S. PATENT DOCUMENTS

| | | | |
|---|---|---|---|
| 4,867,757 A | 9/1989 | Payne | 51/293 |
| 4,934,102 A | 6/1990 | Leach et al. | 51/50 R |
| 5,217,586 A | 6/1993 | Datta et al. | 204/129.6 |
| 5,225,034 A | 7/1993 | Yu et al. | 156/636 |
| 5,264,010 A | 11/1993 | Brancaleoni et al. | 51/308 |
| 5,476,411 A | 12/1995 | Held, III | 451/36 |
| 5,534,106 A | 7/1996 | Cote et al. | 156/636.1 |
| 5,543,032 A | 8/1996 | Datta et al. | 205/670 |
| 5,567,300 A | 10/1996 | Datta et al. | 205/652 |
| 5,575,706 A | 11/1996 | Tsai et al. | 451/41 |
| 5,614,444 A | 3/1997 | Farkas et al. | 437/225 |
| 5,700,383 A | 12/1997 | Feller et al. | 216/88 |
| 5,738,574 A | 4/1998 | Tolles et al. | 451/288 |
| 5,738,800 A | 4/1998 | Hosali et al. | 216/99 |
| 5,769,689 A | 6/1998 | Cossaboon et al. | 451/41 |
| 5,770,095 A | 6/1998 | Sasaki et al. | 216/38 |
| 5,807,165 A | 9/1998 | Uzoh et al. | 451/41 |
| 5,840,629 A | 11/1998 | Carpio | 438/692 |
| 5,846,882 A | 12/1998 | Birang | 438/692 |
| 5,866,031 A | 2/1999 | Carpio et al. | 252/79.1 |
| 5,876,508 A | 3/1999 | Wu et al. | 134/2 |
| 5,911,619 A | 6/1999 | Uzoh et al. | 451/5 |
| 5,911,835 A | 6/1999 | Lee et al. | 134/1.3 |
| 5,931,723 A | 8/1999 | Katsuoka et al. | 451/285 |
| 5,932,486 A | 8/1999 | Cook et al. | 438/692 |
| 5,958,794 A | 9/1999 | Bruxvoort et al. | 438/692 |
| 5,981,454 A | 11/1999 | Small | 510/175 |
| 5,985,748 A | 11/1999 | Watts et al. | 438/622 |
| 6,004,880 A | 12/1999 | Liu et al. | 438/692 |
| 6,033,993 A | 3/2000 | Love, Jr. et al. | 438/745 |
| 6,039,891 A | 3/2000 | Kaufman et al. | 252/79.1 |
| 6,042,741 A | 3/2000 | Hosali et al. | 252/79.1 |
| 6,043,155 A | 3/2000 | Homma et al. | 438/691 |
| 6,046,110 A | 4/2000 | Hirabayashi et al. | 438/693 |
| 6,066,030 A | 5/2000 | Uzoh | 451/41 |
| 6,068,879 A | 5/2000 | Pasch | 427/97 |
| 6,074,949 A | 6/2000 | Schonauer et al. | 438/692 |
| 6,077,337 A | 6/2000 | Lee | 106/3 |
| 6,083,840 A | 7/2000 | Mravic, et al. | 438/693 |
| 6,090,239 A | 7/2000 | Liu et al. | 156/345 |
| 6,096,652 A | 8/2000 | Watts et al. | 438/692 |
| 6,099,394 A | 8/2000 | James et al. | 451/72 |
| 6,103,096 A | 8/2000 | Datta et al. | 205/686 |
| 6,117,775 A | 9/2000 | Kondo et al. | 438/690 |
| 6,117,783 A | 9/2000 | Small et al. | 438/693 |
| 6,121,143 A | 9/2000 | Messner et al. | 438/692 |
| 6,156,661 A | 12/2000 | Small | 438/692 |
| 6,159,076 A | 12/2000 | Sun et al. | 451/36 |
| 6,176,992 B1 | 1/2001 | Talieh | 205/87 |
| 6,194,317 B1 | 2/2001 | Kaisaki et al. | 438/692 |
| 6,217,416 B1 | 4/2001 | Kaufman et al. | 451/41 |
| 6,234,870 B1 | 5/2001 | Uzoh et al. | 451/8 |
| 6,238,592 B1 * | 5/2001 | Hardy et al. | 252/79.1 |
| 6,241,586 B1 | 6/2001 | Yancey | 451/41 |
| 6,248,222 B1 | 6/2001 | Wang | 204/297.09 |
| 6,258,721 B1 | 7/2001 | Li et al. | 438/693 |
| 6,270,393 B1 | 8/2001 | Kubota et al. | 451/36 |
| 6,277,015 B1 | 8/2001 | Robinson et al. | 451/528 |
| 6,416,685 B1 | 7/2002 | Zhang et al. | 252/79.1 |
| 2001/0024878 A1 | 9/2001 | Nakamura | 438/691 |
| 2001/0036746 A1 | 11/2001 | Sato et al. | 438/745 |
| 2001/0042690 A1 | 11/2001 | Talieh | 205/118 |
| 2002/0022370 A1 | 2/2002 | Sun et al. | 438/691 |
| 2002/0070126 A1 | 6/2002 | Sato et al. | 205/640 |

* cited by examiner

ELECTROCHEMICALLY ASSISTED CHEMICAL POLISH

BACKGROUND OF THE DISCLOSURE

1. Field of the Invention

The present invention relates to integrated circuit fabrication and more particularly to the formation of metal layers used in integrated circuits.

2. Description of the Background Art

In the fabrication of integrated circuits (IC's), substrate surface planarity is of critical importance. This is especially so as the scale of integration increases and device features are reduced in size (e.g., sub-micron sizes). Integrated circuits typically include metal layers that are used to interconnect individual devices of the IC. The metal layers are typically isolated from each other by one or more dielectric material layers. Features (e.g., trenches, vias, etc.) formed through the dielectric layers provide electrical access between successive conductive interconnection layers.

Copper is becoming a metal of choice in integrated circuits for the metal layers that provide the electrical access between successive interconnection layers. Copper is preferred due to desirable properties such as lower resistance and better electromigration performance compared to traditional materials such as aluminum.

Copper may be deposited by various techniques such as physical vapor deposition (PVD), chemical vapor deposition (CVD) and electrochemical plating (ECP). ECP is preferred because of its lower cost as compared to other deposition techniques. ECP entails the deposition of a metal conductive layer on a substrate by contacting the substrate with an electrolyte solution and providing an electrochemical potential between two electrodes. Copper ions plate out of the electrolyte solution and deposit onto the substrate.

Copper features are typically formed using damascene or dual damascene processes. In damascene processes, a feature is defined in a dielectric material and subsequently filled with copper. The copper is deposited both in the features and on the surrounding field. The copper deposited on the field is then removed to leave the copper filled feature formed in the dielectric.

The copper deposited on the field may be removed using techniques such as chemical mechanical polishing (CMP). CMP is a common technique used to planarize substrates. In CMP, a chemical polishing slurry, or other fluid medium, may be used in conjunction with mechanical energy to remove material from the substrate surface. However, with reducing dimensions (less than about 0.1 µm) for features on integrated circuits (ICs), it is difficult to planarize a metal surface using mechanical energy based CMP techniques.

Therefore, a need exists in the art for an improved method for planarizing a metal layer, such as a copper layer, on a substrate.

SUMMARY OF THE INVENTION

A method of chemically polishing a metal layer on a substrate is provided. The metal layer is chemically polished using an electrochemical polishing (ECP) process. In the ECP process, the substrate is immersed in a chemical polishing solution including a surfactant. The surfactant in the polishing solution covers the surface of the substrate such that only topographic portions of the substrate surface are exposed to the chemical polishing solution. Thereafter, an electrical potential applied to the substrate removes topographic portions of the substrate that are exposed to the polishing solution.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
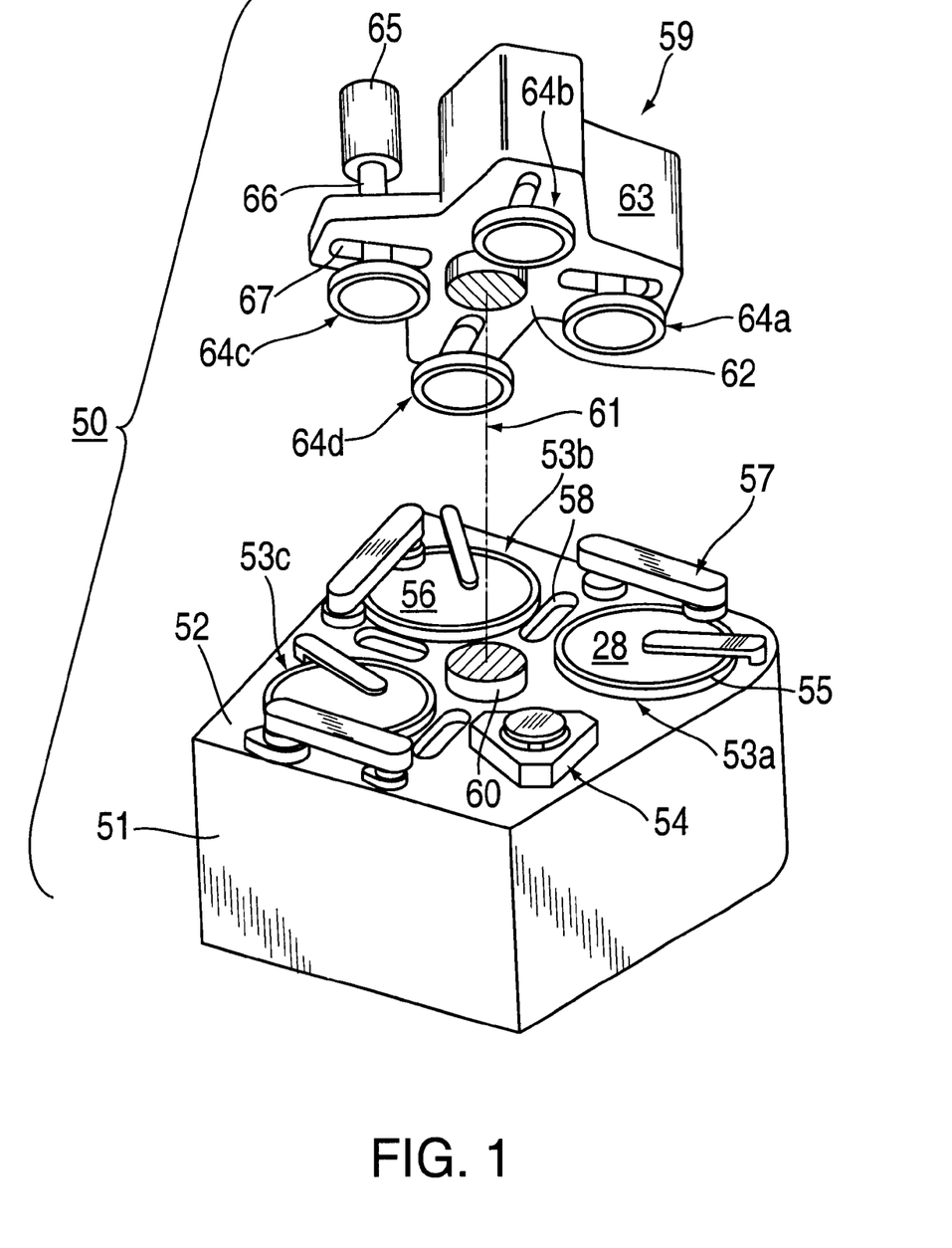
FIG. 1 depicts a schematic illustration of a ECP apparatus that may be used for the practice of embodiments described herein.

Embodiments described herein relate to a method for polishing a metal layer formed on a substrate. The metal layer is polished using an electrochemical polishing (ECP) process. FIG. 1 is a schematic perspective view of an apparatus 50 that may be used to polish the metal layer as described herein. The apparatus 50 is a multi-station type such as is employed in automated semiconductor manufacture processing. The apparatus 50 is adapted to perform both electrochemical polishing (ECP) as well as chemical mechanical polishing (CMP).

Referring to FIG. 1, the apparatus 50 includes a lower machine base 51 having an upper table surface 52 and a removable upper cover (not shown). The upper table surface 52 supports a plurality of substrate process stations 53a, 53b, and 53c, as well as a transfer station 54. The transfer station 54 performs multiple functions such as, for example, receiving individual substrates (not shown) from a loading apparatus (not shown), washing substrates, and loading/unloading substrates to/from carrier heads 64a, 64b, 64c, 64d.

Substrate processing station 53a may be an electrochemical polishing (ECP) station designed for chemically polishing metal layers. ECP station 53a may include a rotatable platen 55 on which is mounted a pad 28.

Substrate process station 53b may be a chemical mechanical polishing (CMP) station designed for planarizing plated metal layers. Chemical mechanical polishing (CMP) station 53b may include a rotatable platen 55 on which is mounted a polishing pad 56. Apparatus 50 may also include a barrier layer polishing station 53c designed for polishing barrier layer materials that may be present on a substrate.

Each of the processing stations 53b and 53c may optionally include a pad conditioner 57. The pad conditioner 57 is used to maintain the condition of the polishing pad 56.

Intermediate washing stations 58 may optionally be positioned between adjacent processing stations 53a, 53b, 53c and transfer station 54. The intermediate washing stations 58 are used to rinse substrates as they are passed from one station to the next.

As illustrated in FIG. 1, a rotatable multi-head carousel 59 is positioned above the lower machine base 51. The multi-head carousel 59 is supported by a center post 60 located on the upper table surface 52 and rotated about carousel axis 61 by means of a motor (not shown), located within the machine base 51. The center post 60 also supports a carousel base plate 62 and associated cover 63.

The multi-head carousel 59 includes four carrier heads 64a, 64b, 64c, 64d. Each carrier head 64a, 64b, 64c, 64d functions to hold substrates during a polishing process. Each carrier head 64a, 64b, 64c, 64d may also function to move substrates to/from the transfer station 54.

Each carrier head 64a, 64b, 64c, 64d is mounted on the carousel base plate 62 at equal angular intervals about the carousel axis 61. The center post 60 permits the carousel motor (not shown) to rotate the multi-head carousel 59 and carrier heads 64a, 64b, 64c, 64d about carousel axis 61.

A carrier drive shaft 66 couples a carrier head rotation motor 65 to each carrier head 64a, 64b, 64c, 64d, so that each carrier head may be rotated about its own axis. In addition, each carrier head 64a, 64b, 64c, 64d may be oscillated laterally in a radial slot 67 formed in the bottom of the carousel base plate 62.

While FIG. 1 illustrates a polishing system including one electrochemical polishing (ECP) station 53a, one chemical mechanical polishing (CMP) station 53b, and one barrier layer polishing station 53c, Systems having two or more electrochemical polishing (ECP) stations and/or chemical mechanical polishing (CMP) stations are also contemplated.

Figure 2:
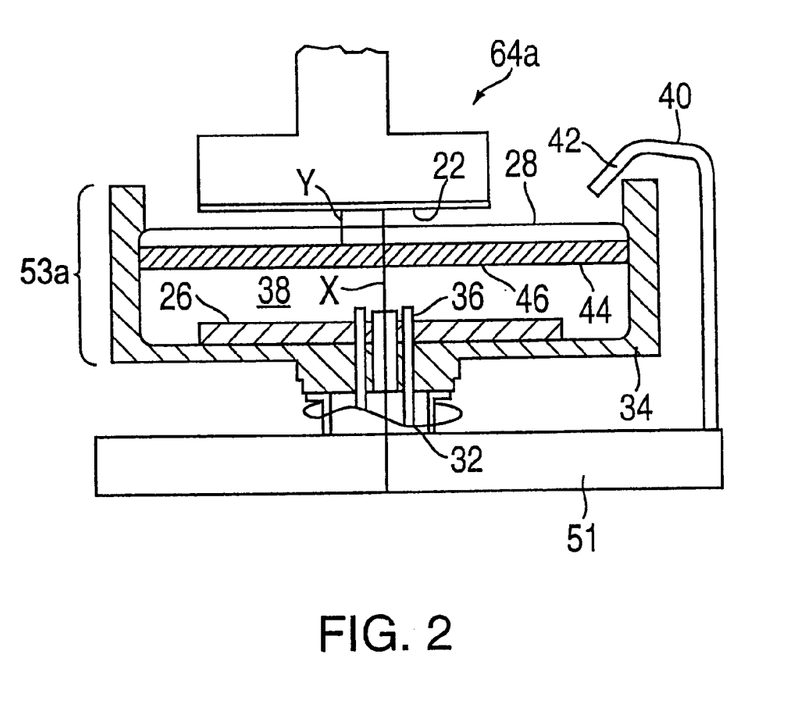
FIG. 2 depicts a schematic cross-sectional view of an ECP system that can be used to chemically polish metal layers on a substrate.

Referring to FIG. 2, a schematic cross-sectional view of an ECP station 53a is shown in greater detail. A substrate 22 is held in place on the ECP head 64a. A partial enclosure 34 generally defines a container or polishing cell within which a polishing electrolyte may be confined.

The polishing electrolyte typically comprises one or more metallic species selected from copper (Cu), aluminum (Al), tungsten (W), gold (Au), silver (Ag), among other materials, which can be electrochemically polished. For example, copper sulfate ($CuSO_4$) may be used as the polishing electrolyte. Copper-containing electrolyte solutions suitable for polishing Cu on the substrate 22 include Ultrafill 2000, commercially available from Shipley Ronel, a division of Rohm and Haas, headquartered in Philadelphia, Pa. The polishing electrolyte solution may optionally comprise pH adjusters such as, for example, sulfuric acid or acetic acid.

The partial enclosure 34 includes an anode 26, a diffuser plate 44, and a pad 28. The pad 28 is disposed on the diffuser plate 44. The partial enclosure 34 is typically a bowl shaped member made of a plastic material such as, for example, fluoropolymers, TEFLON®, and polyethylene, among other materials. The plastic material comprising the partial enclosure 34 should be compatible with the polishing electrolytes used therein, such that they are non-reactive with each other.

The partial enclosure 34 is coupled to a shaft 32 that extends into the base 51. Alternatively, a mounting platform (not shown) may be interposed between the partial enclosure and the shaft 32. The shaft 32 is coupled to an actuator (not shown), such as, for example, a motor (e.g., a stepper motor) disposed in the base 51. The actuator is adapted to rotate the partial enclosure 34 about vertical axis x. Additionally, the shaft 32 has a plurality of ports 36 formed therein. The ports 36 define passageways through which fluid (e.g., polishing electrolyte) is provided to the partial enclosure 34.

The anode 26 is positioned on the lower surface of the partial enclosure 34, such that it is immersed in the polishing electrolyte. Anode 26 typically comprises a ring-shaped, plate-like member. The anode 26 may optionally comprise a plate having a plurality of holes formed therethrough, or multiple anode pieces disposed in a permeable membrane material.

The anode 26 is preferably formed of the material to be polished (e.g., copper (Cu), nickel (Ni), aluminum (Al), gold (Au), silver (Ag), and tungsten (W)), although it may optionally be formed of a material other than the material to be polished such as, for example, platinum (Pt). The anode 26 may also comprise a consumable material, requiring the periodic replacement thereof.

The pad 28 is disposed on the diffuser plate 44. The pad 28 is preferably conductive to ions in the polishing electrolyte such as copper ions, for example, used for copper polishing applications. The metal polishing electrolyte is supplied to the pad 28 through a fluid delivery line 40, having an outlet 42 positioned above the pad 28. The pad 28 may optionally be disposed adjacent to or placed in contact with the anode 26. Additionally, the pad 28 should be compatible with the polishing electrolytes used for polishing the conductive metal layer, such that they are non-reactive with each other. The pad 28 may optionally comprise a plurality of pores and/or grooves to provide electrolyte from the bulk solution in region 38 of enclosure 34 toward the gap between the substrate 22 and the pad 28.

The pad 28 may comprise a polymeric material such as polyurethane. Examples of suitable pads may include, for example, IC 1000 pads, IC 1010 pads, Suba series pads, Politex series pads, and MH S series pads, commercially available from Rodel, Inc., of Phoenix, Ariz. Other suitable pads include polyvinylidene fluoride (PVDF) pads commercially available from Asahi, Japan, and fixed abrasive pads commercially available from 3M Corporation, Minneapolis, Minn.

The diffuser plate 44 is used to support the pad 28 in the partial enclosure 34. The diffuser plate 44 may be secured in the partial enclosure 34 using fasteners such as, for example, screws. Other suitable fastening means may include snap or interference fit with the enclosure 34 (not shown), suspension attachment (not shown), and the like. The diffuser plate 44 may be made of a plastic material such as, for example, fluoropolymers, polyethylenes, and TEFLON®, among others. The diffuser plate 44 should also be compatible with the polishing electrolytes used for polishing the conductive metal layer, such that they are non-reactive with each other.

The diffuser plate 44 may optionally have a plurality of holes or channels 46 formed therein. The holes 46 are sized to enable fluid flow therethrough and to provide a uniform distribution of electrolyte through the pad 28 toward the substrate 22.

The pad 28 may optionally be fastened to the diffuser plate 44 using adhesives that are compatible with the fluid environment. The diffuser plate 44 is preferably spaced from the anode 26 to reduce the sensitivity of the conductive metal layer thickness to the anode dimensions.

A membrane (not shown) may be disposed between the anode 26 and the pad 28 to prevent particles and/or by-products produced at the anode from depositing on the substrate 22 surface. The membrane should be permeable to electrolyte flow, but not permeable to particles and/or byproducts produced at anode 26.

The ECP head 64a is movably positioned above the pad 28. The ECP head 64a is both vertically and laterally movable relative to the pad 28. For example, ECP head 64a may be vertically movable about the x-axis, and rotatable about the y-axis. The x- and y-axes of the partial enclosure 34 and the ECP head 64a, respectively, are typically offset to provide orbital motion between the pad 28 and the ECP head 64a. Orbital motion is broadly described herein as an elliptical relative motion between the pad 28 and the ECP head 64a. The ECP head 64a holds a substrate 22 with the surface to be polished facing downward toward the pad 28.

Figure 3:
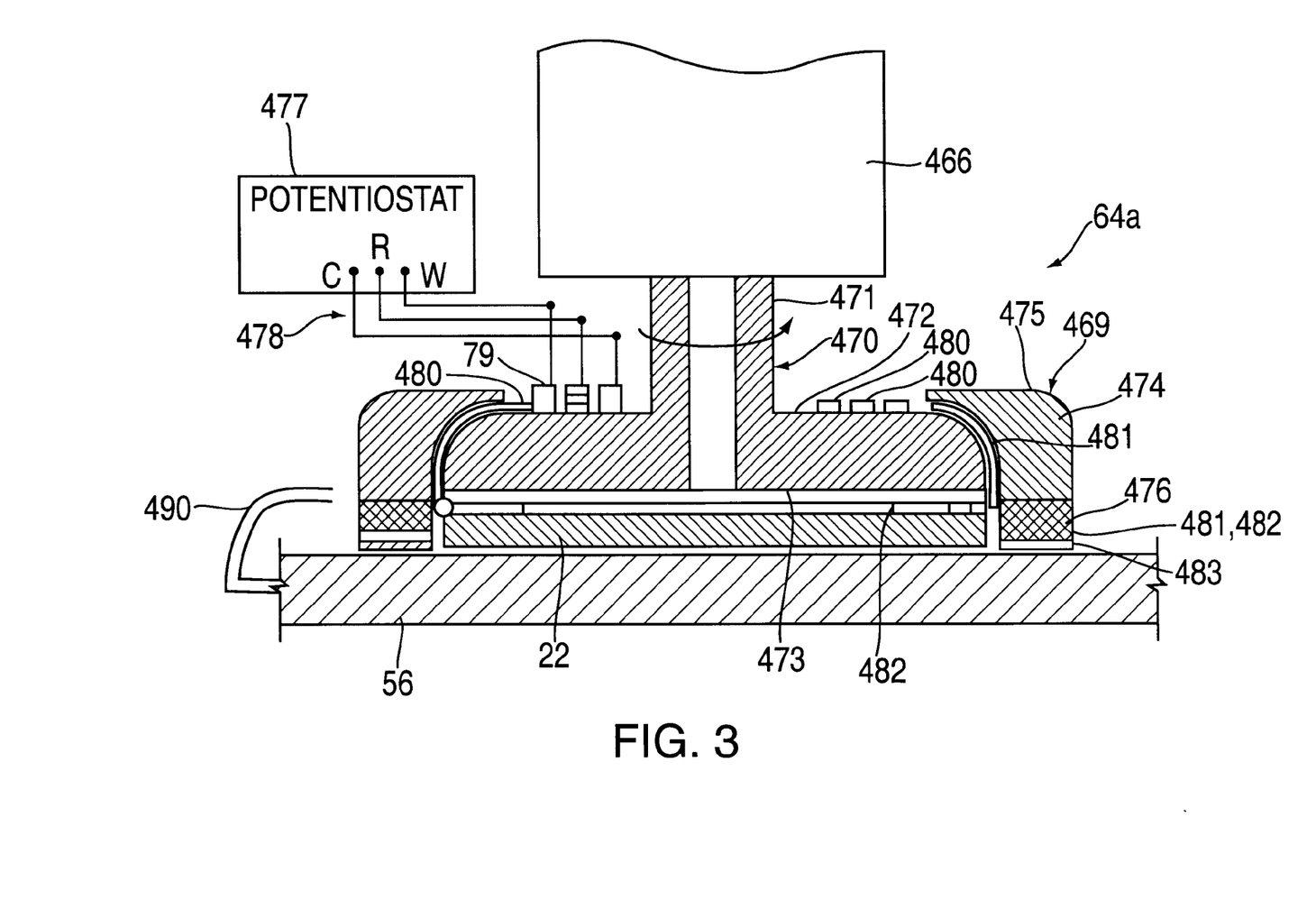
FIG. 3 depicts a schematic cross-sectional view of a portion of an ECP head system that can be used to chemically polish metal layers on the substrate.

FIG. 3 depicts a schematic cross-sectional view of an electrochemical polishing (ECP) head 64a. The ECP head 64a is in operative position facing a pad (not shown). A shaft or spindle 466 is operatively coupled to a head assembly 469. The head assembly 469 comprises a circularly-shaped, inner mounting piece 470 having a narrow, shaft-like, axially extending upper portion 471 coupled to a drive shaft 466. A lower portion 472 of the mounting piece 470 includes a diffuser plate 473 for mounting the substrate 22 thereon. The lower portion of the mounting piece also has an outer, annularly-shaped mounting piece 474 including an inwardly extending flange portion 475 at its upper end and an annularly-shaped retaining ring 476 at its lower end.

The ECP head 64a is adapted to provide for the controlled application of a time-varying electrochemical potential (e.g., a variable anodic potential) to substrate 22. A programmable electronic potentiostat 477 having working (w), counter (c), and reference (r) electrode outputs is operatively coupled to the head assembly 469 by means of respective electrical leads 478, brush-type electrical contacts 79, and concentric contact rings 480, formed on the upper surface of the lower portion 472 of mounting piece 470. Respective electrical leads connected to contact rings 480 are also connected to an annularly-shaped electrical contact located between the diffuser plate 473 and the rear surface of substrate 22 (inwardly of the substrate circumference), for permitting functioning of the substrate as a working (w) electrode. Electrical leads are also coupled to a plurality of counter electrodes 481 (e.g., formed of an electrochemically inert, electrically conductive material such as Pt or C) and reference electrodes 482 (e.g., formed of Pt or Ag/AgCl) positioned in grooved recesses 483 formed in the lower surface of retaining ring 476. A polishing electrolyte is supplied to the pad 56 through a fluid delivery arm 490.

Alternatively, the reference electrodes 482 and the electrode potentiostat 477 may be replaced with a 2-electrode programmable DC power supply. Moreover, a coulometer may be electrically positioned in either the working electrode or counter-electrode circuit, for providing end-point indication/detection. Alternatively, a detector for measuring a physical property (e.g., eddy currents) or an optical property (e.g., reflectance as indicated by means of a conventional light source/photocell apparatus) for determining the end-point of ECP processing may also be used.

While the ECP head 64a is presented as having the configuration of component parts described above, other configurations are also contemplated.

Electrochemical Polishing (ECP)

A metal layer such as copper may be polished using an electrochemical polishing (ECP) technique. In the ECP process, the substrate is immersed in a chemical polishing solution including a surfactant. The surfactant in the polishing solution covers the surface of the substrate such that only topographic portions of the substrate surface are exposed to the chemical polishing solution. Thereafter, an electrical potential applied to the substrate removes topographic portions of the substrate that are exposed to the polishing solution.

Figure 5A:
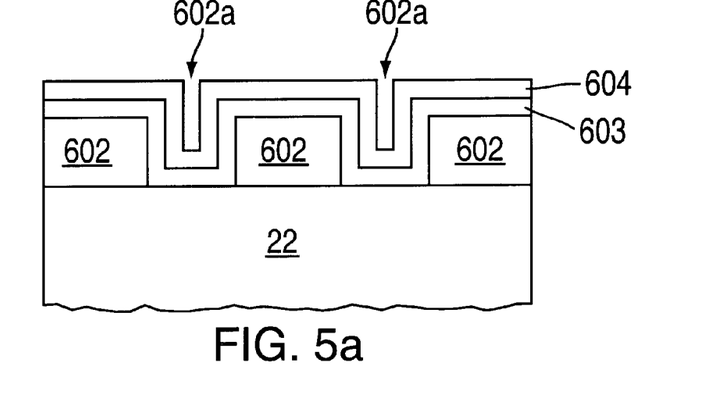
FIGS. 5a–5c depict schematic cross-sectional schematic views of a substrate during various stages of integrated circuit fabrication including an ECP process sequence.
Figure 5B:
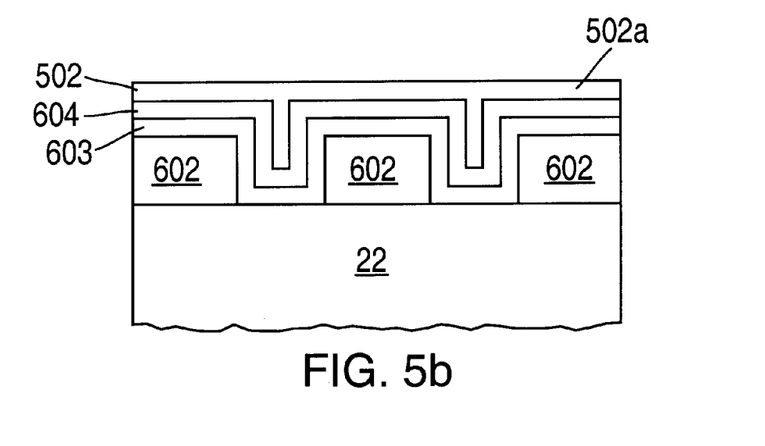
Figure 5C:
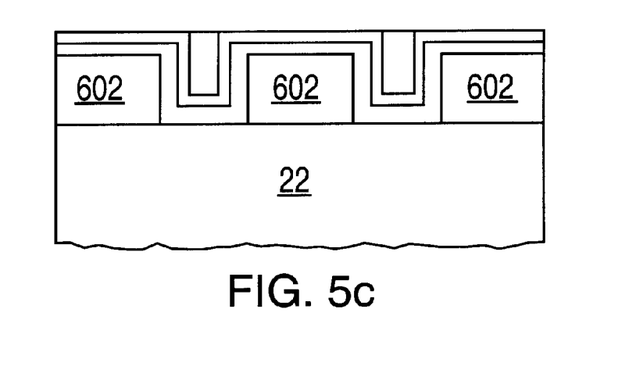

Referring to FIGS. 2, 3, and 5a, a substrate 22 is attached onto the ECP head 64a and positioned within the enclosure 34 of ECP station 53a. The substrate 22 may include, for example, a dielectric material 602, a barrier layer 603, and a seed layer 604. The dielectric material 602 has vias (holes) 602a defined therein.

A polishing electrolyte solution is provided to the enclosure 34 from fluid delivery line 40. The substrate 22 is positioned so as to be in contact with polishing electrolyte above the pad 28. The polishing electrolyte preferably comprises at least one surfactant. The surfactant functions to form a protective layer on portions of the surface of the substrate. The protective layer is believed to orient parallel to the metal layer during polishing. In this manner, the protective layer insulates portions of the substrate surface from reacting with the polishing electrolyte. The protective layer has a thickness that is a function of the polishing composition, including the nature and concentration of the surfactant, the nature of the metal layer, the speed at which the substrate is rotated in the polishing electrolyte, as well as the surface topography of the metal layer.

Figure 4A:
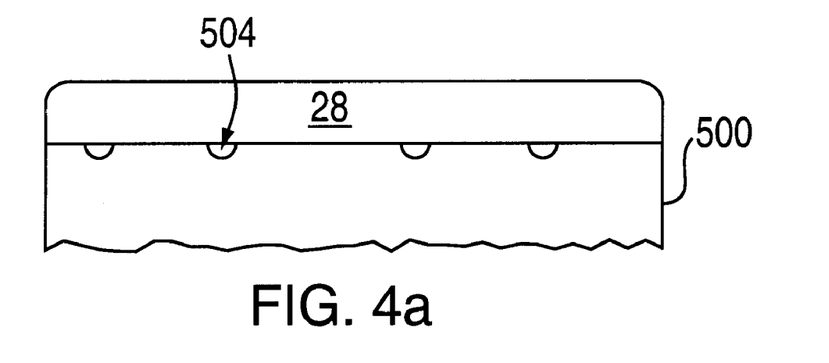
FIGS. 4a–4b depict schematic cross-sectional views of metal layer polishing using an ECP process.
Figure 4B:
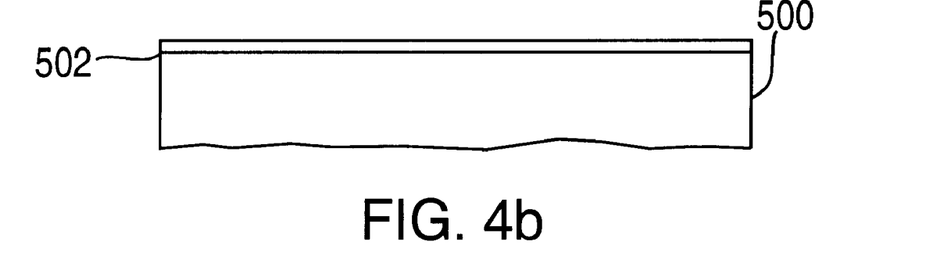
Figure 6:
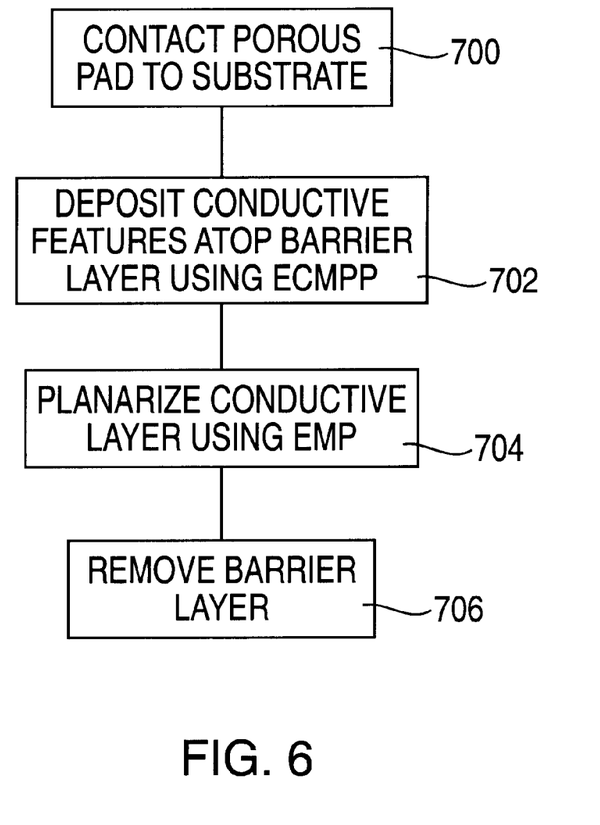
FIG. 6 illustrates a process flow diagram for a substrate undergoing an ECP process sequence.

Referring to FIGS. 4a and 6, polishing of the metal layer 502 begins with step 700. The substrate 22 is immersed in a chemical polishing solution including a surfactant. The surfactant in the polishing solution covers the surface of the substrate such that only topographic portions of the substrate surface are exposed to the chemical polishing solution. The substrate 22 may rotate while immersed in the polishing electrolyte. The substrate 22 may rotate at a velocity of about greater than about 5,000 rpm.

During the polishing process, the surfactant acts to cover portions of the metal layer so that only topographic portions of substrate 22 are in contact with the polishing electrolyte. The surfactant prevents the polishing electrolyte from contacting the surface of the substrate 22 in locations where localized depressions 504 exist, such that metal polishing only occurs on the topographic portions of the substrate 22.

The surfactant preferably comprises an organic material including polar moieties, such as, for example, sulfates, sulfonates, carboxylates, alkylene oxides, esters, polyglycosides, betaines, amides, and amines among others. The surfactant may also include non-polar moieties, such as, for example, alkyl groups, aryl groups, allyl groups, and benzyl groups, among others.

Examples of suitable surfactants may include one or more compounds selected from the group of benzopyran, thiourea, and aliphatic ethers. For example, the surfactant may comprise a benzopyran-containing compound, 2-H-1-benzopyran-2-one, $C_9O_2H_6$, (i.e. coumarin), or its derivatives. The benzopyran-containing derivatives may further comprise additional functional groups including alcohols, carboxylic acids, and ethers, among others. The surfactant may also comprise, for example, sulfourea, $CH_4N_2S$, or its derivatives. Derivatives of sulfourea may further comprise additional functional groups including alkyl groups, alcohols, and carboxylic acids, among others. The surfactant may also comprise, for example, an aliphatic ether having a chemical formula, $RC_6H_5O—(R'—O)_n$, where R and R' refer to aliphatic hydrocarbon groups and n refers to an integer with a value of 1–10. The concentration of the surfactant may range from about 0.1 wt. % to about 30 wt. %.

The polishing electrolyte may further comprise one or more etchants (inorganic or organic acids) and one or more oxidizers. Suitable etchants include hydrogen peroxide, ferric nitrate, iodate-containing materials, acetic acid, phosphoric acid, oxalic acid, or combinations thereof, among others. The concentration of the one or more etchants may range from about 0.1 wt. % to about 50 wt. %.

The polishing composition may further comprise a corrosion inhibitor. Suitable corrosion inhibitors may include benzotriazole (BTA) or 5methyl-1-benzotriazole (TTA), and combinations thereof, among others. The concentration of the one or more corrosion inhibitors may range from about 0.1 wt % to about 25 wt. %.

In order to provide a greater degree of control to the rate of dissolution, a power source (not shown) is used to apply a potential difference between the substrate 22 and the anode 26. The potential difference is applied between the anode 26 and the working electrode (w). The potential difference applied between the anode 26 and the working electrode (w) is typically within a range of about 0.2 volts to about 5 volts. The applied voltage depends upon the nature of the pad material and cell configuration. The potential difference provides an electrochemical driving force for metal ions from the surface of the substrate 22 to dissolve in the electrolyte solution.

Metal on the unprotected topographic areas of the substrate are oxidized and are dissolved in the liquid phase of the polishing composition. A corresponding reaction takes place at the cathode wherein the either the cathode material, hydrogen ions, or dissolved oxygen or other chemical constituents within the enclosure are reduced. The oxidation and reduction reactions occur continually as the potential is applied, forming a electrochemical cell.

The composition of the polishing electrolyte as well as the applied electrochemical potential may be varied in time throughout the polishing process in order to optimize process throughput as well as the process yield. Furthermore, the polishing electrolyte as well as the rotational velocity may be adjusted by means of a feedback loop that incorporates a microprocessor and a controller during the polishing of the conductive layer.

The ECP process described herein is particularly advantageous in that it enables one to fine tune size of the features to be polished as well as the rate of polishing. The surfactant type, concentration and rotational velocity may be altered to control the thickness of the protective layer and thereby the size of the topographic region to be polished. Furthermore, the rate of polishing may be adjusted as a function of the etchant type and concentration as well the magnitude of the applied electrochemical potential.

After the metal layer is polished 502 using the ECP process described above, the barrier layer 603 may be removed by transferring the substrate 22 to chemical mechanical polishing station 53b and/or barrier removal station 53c, as indicated in step 706 of FIG. 6. The process for removing the barrier layer may be a single step or multi step CMP process.

Although several preferred embodiments, which incorporate the teachings of the present invention, have been shown and described in detail, those skilled in the art can readily devise many other varied embodiments that still incorporate these teachings.

What is claimed is:

1. An electrolyte composition for removing at least a portion of a metal layer, consisting essentially of:
    one or more surfactants selected from the group consisting of benzopyran-containing materials, thiourea-containing materials, and aliphatic ether-containing materials;
    one or more chemical etchants; and
    one or more corrosion inhibitors.

2. The electrolyte composition of claim 1, wherein the concentration of the one or more surfactants is in the range of about 0.1 wt. % to about 30 wt. %.

3. The electrolyte composition of claim 1, wherein the one or more chemical etchants comprise one or more oxidizers.

4. The electrolyte composition of claim 3, wherein the one or more oxidizers are selected from the group consisting of hydrogen peroxide, ferric nitrate, iodate-containing materials, acetic acid, phosphoric acid, oxalic acid, and combinations thereof.

5. The electrolyte composition of claim 3, wherein the concentration of the one or more etchants is in the range of about 0.1 wt. % to about 50 wt. %.

6. The electrolyte composition of claim 1, wherein the one or more corrosion inhibitors are selected from the group consisting of benzotriazole (BTA), 5-methyl-1-benzotriazole (TTA), and combinations thereof.

7. The electrolyte composition of claim 6, wherein the concentration of the one or more corrosion inhibitors is in the range of about 0.1 wt. % to about 25 wt. %.

8. A method of removing a portion of a metal layer on a substrate, comprising:
    immersing a substrate having a metal layer thereon in an electrolyte composition comprising:
        one or more surfactants selected from the group consisting of benzopyran-containing materials, thiourea-containing materials, and aliphatic ether-containing materials;
        one or more chemical etchants; and
        one or more corrosion inhibitors;
    rotating the substrate relative to the electrolyte composition to form a protective layer on portions of the surface of the metal layer;
    applying an electrochemical potential between the substrate and a anode immersed in the electrolyte composition; and
    removing portions of the metal layer.

9. The method of claim 8, wherein the metal layer comprises copper.

10. The method of claim 8, wherein the concentration of the one or more surfactants is in the range of about 0.1 wt. % to about 30 wt. %.

11. The method of claim 8, wherein the one or more etchants comprise one or more oxidizers.

12. The method of claim 11, wherein the one or more oxidizers are selected from the group consisting of hydrogen peroxide, ferric nitrate, iodate-containing materials, acetic acid, phosphoric acid, oxalic acid, and combinations thereof.

13. The method of claim 11, wherein the concentration of the one or more etchants is in the range of about 0.1 wt. % to about 50 wt. %.

14. The method of claim 8, further comprising chemical mechanical polishing the metal layer after removing portions of the metal layer.

15. The method of claim 14, wherein the one or more corrosion inhibitors are selected from the group consisting of benzotriazole (BTA), 5-methyl-1-benzotriazole (TTA), and combinations thereof.

16. The method of claim 14, wherein the concentration of the one or more corrosion inhibitors is in the range of about 0.1% by weight to about 25% by weight.

17. The method of claim 8, wherein the substrate rotates relative to the electrolyte composition at a velocity greater than about 5,000 rpm.

18. The method of claim 8, wherein the metal layer is disposed on a barrier layer on the substrate.

19. The method of claim 18, further comprising removing the barrier layer from the substrate surface after removing portions of the metal layer.

20. The method of claim 8, wherein the electrochemical potential is within a range of about 0.2 volts to about 5 volts.

* * * * *

UNITED STATES PATENT AND TRADEMARK OFFICE
CERTIFICATE OF CORRECTION

PATENT NO. : 6,592,742 B2
DATED : July 15, 2003
INVENTOR(S) : Sun et al.

It is certified that error appears in the above-identified patent and that said Letters Patent is hereby corrected as shown below:

Title page,
Item [56], References Cited, U.S. PATENT DOCUMENTS, please insert
-- 6,299,741 --.

Column 7,
Line 1, please change "5methyl" to -- 5-methyl --.

Signed and Sealed this

Twenty-third Day of December, 2003

JAMES E. ROGAN
*Director of the United States Patent and Trademark Office*